(12) United States Patent
Koseoglu et al.

(10) Patent No.: US 11,807,815 B2
(45) Date of Patent: Nov. 7, 2023

(54) METHOD OF PRODUCING PLASTIC PYROLYSIS PRODUCTS FROM A MIXED PLASTICS STREAM

(71) Applicant: Saudi Arabian Oil Company, Dhahran (SA)

(72) Inventors: Omer Refa Koseoglu, Dhahran (SA); Yaming Jin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 13 days.

(21) Appl. No.: 17/672,981

(22) Filed: Feb. 16, 2022

(65) Prior Publication Data

US 2023/0257661 A1 Aug. 17, 2023

(51) Int. Cl.
*C10G 1/10* (2006.01)
*C10G 1/00* (2006.01)
(Continued)

(52) U.S. Cl.
CPC ............. *C10G 1/10* (2013.01); *B01J 19/245* (2013.01); *C10G 1/002* (2013.01); *C10G 67/02* (2013.01);
(Continued)

(58) Field of Classification Search
CPC .......... C10G 1/10; C10G 1/002; C10G 67/02; C10G 2300/1003; C10G 2300/202;
(Continued)

(56) References Cited

U.S. PATENT DOCUMENTS

| | | |
|---|---|---|
| 3,074,878 A | 1/1963 | Pappas |
| 3,492,220 A | 1/1970 | Lempert et al. |

(Continued)

FOREIGN PATENT DOCUMENTS

| | | |
|---|---|---|
| FR | 3054557 A1 | 2/2018 |
| FR | 3054558 A1 | 2/2018 |

(Continued)

OTHER PUBLICATIONS

U.S. Office Action dated Mar. 24, 2022 pertaining to U.S. Appl. No. 17/355,718, filed Jun. 23, 2021, 21 pages.

(Continued)

*Primary Examiner* — Thuan D Dang
(74) *Attorney, Agent, or Firm* — DINSMORE & SHOHL LLP

(57) ABSTRACT

Method of producing pyrolysis products from a mixed plastics stream along with an associated system for processing mixed plastics. The method includes conducting pyrolysis of a plastic feedstock to produce a stream of plastic pyrolysis oil; feeding the plastic pyrolysis oil to an aromatization unit having an aromatization reactor with an aromatization catalyst disposed therein to generate an aromatics rich stream; and passing the aromatics rich stream to an aromatic recovery complex to separate the aromatics rich stream into a BTX fraction, a gasoline blending fraction, a gas fraction comprising hydrogen and C1-C4 hydrocarbons, and an aromatic bottoms fraction comprising hydrocarbons boiling above 180° C., where the BTX fraction consists of benzene, toluene and mixed xylenes and the gasoline blending fraction comprises aliphatic hydrocarbons with a boiling range from C5 hydrocarbon up to the aromatic bottoms fraction.

16 Claims, 4 Drawing Sheets

(51) Int. Cl.
  *C10G 67/02* (2006.01)
  *B01J 19/24* (2006.01)
(52) U.S. Cl.
  CPC .............. *B01J 2219/0004* (2013.01); *C10G 2300/1003* (2013.01); *C10G 2300/202* (2013.01); *C10G 2300/205* (2013.01); *C10G 2300/301* (2013.01); *C10G 2300/308* (2013.01); *C10G 2300/4006* (2013.01); *C10G 2300/4012* (2013.01); *C10G 2300/4018* (2013.01); *C10G 2400/30* (2013.01)
(58) Field of Classification Search
  CPC ........ C10G 2300/205; C10G 2300/301; C10G 2300/308; C10G 2300/4006; C10G 2300/4012; C10G 2300/4018; C10G 2400/30; B01J 19/154; B01J 2219/0004
  See application file for complete search history.

(56) References Cited

U.S. PATENT DOCUMENTS

| | | | |
|---|---|---|---|
| 3,494,859 A | 2/1970 | Parker | |
| 3,758,403 A | 9/1973 | Rosinski et al. | |
| 3,894,931 A | 7/1975 | Nace et al. | |
| 3,894,933 A | 7/1975 | Owen et al. | |
| 3,894,934 A | 7/1975 | Owen et al. | |
| 3,960,978 A | 6/1976 | Givens et al. | |
| 4,419,221 A | 12/1983 | Castagnos, Jr. et al. | |
| 4,980,053 A | 12/1990 | Li et al. | |
| 5,216,149 A | 6/1993 | Evans et al. | |
| 5,300,704 A | 4/1994 | Evans et al. | |
| 5,321,174 A | 6/1994 | Evans et al. | |
| 5,326,465 A | 7/1994 | Yongqing et al. | |
| 5,359,061 A | 10/1994 | Evans et al. | |
| 5,359,099 A | 10/1994 | Evans et al. | |
| 5,386,070 A | 1/1995 | Evans et al. | |
| 5,462,652 A | 10/1995 | Wegerer | |
| 5,464,602 A | 11/1995 | Evans et al. | |
| 5,821,553 A | 10/1998 | Evans et al. | |
| 5,904,838 A | 5/1999 | Kalnes et al. | |
| 6,143,940 A | 11/2000 | Miller et al. | |
| 6,444,118 B1 | 9/2002 | Podrebarac et al. | |
| 6,656,346 B2 | 12/2003 | Ino et al. | |
| 6,822,126 B2 | 11/2004 | Miller | |
| 8,277,643 B2 | 10/2012 | Huber et al. | |
| 8,864,984 B2 | 10/2014 | Huber et al. | |
| 9,169,442 B2 | 10/2015 | Huber et al. | |
| 9,428,695 B2 | 8/2016 | Narayanaswamy et al. | |
| 9,447,332 B2 | 9/2016 | Narayanaswamy et al. | |
| 9,453,166 B2 | 9/2016 | Huber et al. | |
| 9,458,394 B2 | 10/2016 | Dean et al. | |
| 9,896,627 B2 | 2/2018 | Koseoglu | |
| 10,308,896 B2 | 6/2019 | Scheibel et al. | |
| 10,442,997 B2 | 10/2019 | Narayanaswamy et al. | |
| 10,858,593 B2 | 12/2020 | Ramamurthy et al. | |
| 10,975,313 B2 | 4/2021 | Ramamurthy et al. | |
| 2002/0183192 A1* | 12/2002 | Verduijn | C07C 4/06 502/67 |
| 2003/0042175 A1 | 3/2003 | Debuisschert et al. | |
| 2003/0199717 A1 | 10/2003 | Miller | |
| 2003/0199718 A1 | 10/2003 | Miller | |
| 2009/0151233 A1 | 6/2009 | Miller | |
| 2012/0108866 A1 | 5/2012 | Grenoble et al. | |
| 2016/0362609 A1 | 12/2016 | Ward et al. | |
| 2017/0101592 A1 | 4/2017 | Green | |
| 2018/0002609 A1 | 1/2018 | Narayanaswamy et al. | |
| 2018/0023010 A1 | 1/2018 | Leflaive et al. | |
| 2019/0153338 A1 | 5/2019 | Charra et al. | |
| 2020/0017773 A1* | 1/2020 | Ramamurthy | B01J 6/008 |
| 2021/0189250 A1 | 6/2021 | Timken | |

FOREIGN PATENT DOCUMENTS

| | | |
|---|---|---|
| KR | 102004522 B1 | 7/2019 |
| WO | 2021201932 A1 | 10/2021 |

OTHER PUBLICATIONS

Notification of Transmittal of the International Search Report and Written Opinion of the International Searching Authority, or the Declaration dated Feb. 22, 2023 pertaining to International application No. PCT/US2022/049245 filed Nov. 8, 2022, pp. 1-13.

\* cited by examiner

METHOD OF PRODUCING PLASTIC PYROLYSIS PRODUCTS FROM A MIXED PLASTICS STREAM

TECHNICAL FIELD

The present disclosure relates to method of producing pyrolysis products from a mixed plastics stream. In particular, certain embodiments of the disclosure relate to methods to producing aromatics from waste plastic feedstock.

BACKGROUND

Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Plastics pyrolyze at high temperatures and can be converted back to their original monomers as gas or liquid and can be recovered. However, the additives added to the plastic during production present challenges in effectively utilizing the recovered products from pyrolysis. Upon pyrolysis, the additives end-up in the pyrolysis products.

SUMMARY

Accordingly, there is a clear and long-standing need to provide a solution to utilize the pyrolysis products generated from the pyrolysis of plastics. To utilize such pyrolysis products the residue left from the additives in the pyrolysis product must be removed or the pyrolysis products utilized in a manner that the residue is not destructive.

The generated pyrolysis products comprise a substantial portion of naphtha and other hydrocarbon streams which are desirably able to be implemented as feed streams to existing or new refining processes. The transformation of light naphtha or C5-C6 streams, which originates from refinery and gas plants, into value-added gasoline blending components has been an ongoing challenge to researchers in academia and industry. The primary use for light naphtha is as feed for steam crackers or the production of olefins such as ethylene, propylene, and butenes and as a blending stock for gasoline production. However, the light naphtha stream has become an undesirable gasoline blending component because of its low octane number and high vapor pressure. This challenge has led refiners to seek options to upgrade this low-value stream into higher value products.

The transformation of light naphtha has been hindered by inertness of carbon-carbon and carbon-hydrogen bonds, which results in an elevated temperature and, therefore, unfavorable thermodynamics, low selectivity and yields, generally result in high cost for commercial applications. However, the current global demand for gasoline is 26.1 million barrels per day (bpd) or about 26% of global refined products demand with global gasoline demand expected to continue an average annual growth rate of 2.3%. The gasoline pool receives product streams, such as isomerate, reformate, alkylate, and fluid catalytic cracking (FCC) gasoline, from different units in the refinery as well as the addition of renewable oxygenates. The composition of gasoline comprises different compounds of paraffins, isoparaffins, olefins, naphthenes, and aromatics, known as PIONA. As such, it is desirable to process the products generated from the pyrolysis of plastics into gasoline replacements or blending streams. One solution is to process the products generated from the pyrolysis of plastics through aromatization to convert the naphtha and distillate components of the generated plastic pyrolysis oil into aromatics.

In accordance with one or more embodiments of the present disclosure, a method of producing pyrolysis products from a mixed plastics stream is disclosed. The method includes (a) conducting pyrolysis of a plastic feedstock to produce a stream of plastic pyrolysis oil; (b) feeding the plastic pyrolysis oil to an aromatization unit having an aromatization reactor with an aromatization catalyst disposed therein to generate an aromatics rich stream; and (c) passing the aromatics rich stream to an aromatics recovery complex to separate the aromatic rich stream into a BTX fraction, a gasoline blending fraction, a gas fraction including hydrogen and C1-C4 hydrocarbons, and an aromatic bottoms fraction including hydrocarbons boiling above 180° C. The BTX fraction consists of benzene, toluene and mixed xylenes and the gasoline blending fraction includes aliphatic hydrocarbons with a boiling range from C5 hydrocarbons up to the aromatic bottoms fraction.

In some embodiments, a first fractionator separates the plastic pyrolysis oil into a first distillate fraction comprising hydrocarbons boiling in the range of 36 to 370° C. and a residual heavy fraction comprising hydrocarbons boiling above 370° C., and the first distillate fraction is fed to the aromatization unit in lieu of an entirety of the plastic pyrolysis oil.

In some embodiments, the first fractionator further separates the first distillate fraction into a plastic pyrolysis naphtha stream and a plastic pyrolysis second distillate stream; and the aromatization unit is split into a naphtha aromatization unit having a naphtha aromatization reactor fed by the plastic pyrolysis naphtha stream and a second distillate aromatization unit having a second distillate aromatization reactor fed by the plastic pyrolysis second distillate stream.

In some embodiments, each aromatization unit further includes a selective hydrogenation unit configured and operated to remove di-olefins by hydrogenation to generate a dediolefinized stream for provision to the aromatization reactor provided in each aromatization unit.

In accordance with one or more embodiments of the present disclosure, a system for processing mixed plastics into plastic pyrolysis products is disclosed. The system includes an inlet stream comprising mixed plastics; a plastic pyrolysis unit, the plastic pyrolysis unit in fluid communication with the inlet stream, and operable to generate a stream of plastic pyrolysis oil from the inlet stream; an aromatization unit in fluid communication with the stream of plastic pyrolysis oil, the aromatization unit having an aromatization reactor with an aromatization catalyst disposed therein operable to generate an aromatics rich stream; and an aromatics recovery complex in fluid communication with the aromatics rich stream, the aromatics recovery complex operable to separate the aromatic rich stream into a BTX fraction, a gasoline blending fraction, a gas fraction formed from hydrogen and C1-C4 hydrocarbons, and an aromatic bottom fraction formed from hydrocarbons boiling above 180° C. The BTX fraction consists of benzene, toluene and mixed xylenes and the gasoline blending fraction includes aliphatic hydrocarbons with a boiling range from C5 hydrocarbons up to the aromatic bottoms fraction.

In some embodiments, a first fractionator is further provided. The first fractionator is in fluid communication with the stream of plastic pyrolysis oil and separates the plastic pyrolysis oil into a first distillate fraction formed from hydrocarbons boiling in the range of 36 to 370° C. and a residual heavy fraction formed from hydrocarbons boiling above 370° C., with the first distillate fraction in fluid communication with the aromatization unit in lieu of an entirety of the stream of plastic pyrolysis oil.

In some embodiments, the first fractionator further separates the first distillate fraction into a plastic pyrolysis naphtha stream and a plastic pyrolysis second distillate stream; and the aromatization unit is split into a naphtha aromatization unit having a naphtha aromatization reactor and a second distillate aromatization unit having a second distillate aromatization reactor.

In some embodiments, each aromatization unit further includes a selective hydrogenation unit configured and operated to remove di-olefins by hydrogenation to generate a dediolefinized stream for provision to the aromatization reactor provided in each aromatization unit.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some of which are illustrated in the accompanying drawings. Whenever possible, the same reference numerals will be used throughout the drawings to refer to the same or similar units.

DETAILED DESCRIPTION

Embodiments of systems and associated methods for producing pyrolysis products from a mixed plastics stream are provided in the present disclosure.

A system for processing mixed plastics into plastic pyrolysis products includes an inlet stream comprising mixed plastics, a plastic pyrolysis unit, an aromatization unit, and an aromatic recovery complex. The plastic pyrolysis unit is provided in fluid communication with the inlet stream and is operable to generate a stream of plastic pyrolysis oil from the inlet stream. The aromatization unit is provided in fluid communication with the stream of plastic pyrolysis oil. Further, the aromatization unit is operable to generate an aromatic rich stream and includes an aromatization reactor with an aromatization catalyst disposed therein. The aromatic recovery complex is provided in fluid communication with the aromatic rich stream and is operable to separate the aromatic rich stream into a BTX fraction, a gasoline blending fraction, a gas fraction, and an aromatic bottoms fraction comprising hydrocarbons boiling above 180° C. The BTX fraction consists of benzene, toluene and mixed xylenes and the gasoline blending fraction comprises aliphatic hydrocarbons with a boiling range from C5 hydrocarbons up to the aromatic bottoms fraction.

The associated method of producing pyrolysis products from a mixed plastics stream includes conducting pyrolysis of a plastic feedstock to produce a stream of plastic pyrolysis oil, feeding the plastic pyrolysis oil to an aromatization unit comprising an aromatization reactor with an aromatization catalyst disposed therein to generate an aromatics rich stream, and passing the aromatics rich stream to an aromatics recovery complex to separate the aromatic rich stream into a BTX fraction, a gasoline blending fraction, a gas fraction comprising hydrogen and C1-C4 hydrocarbons, and an aromatic bottoms fraction comprising hydrocarbons boiling above 180° C. The BTX fraction consists of benzene, toluene and mixed xylenes and the gasoline blending fraction comprises aliphatic hydrocarbons with a boiling range from C5 hydrocarbons up to aromatic bottoms fraction.

Having generally described the system and associated methods of producing pyrolysis products from a mixed plastics stream, embodiments of the same are described in further detail and with reference to the various Figures.

Figure 1:
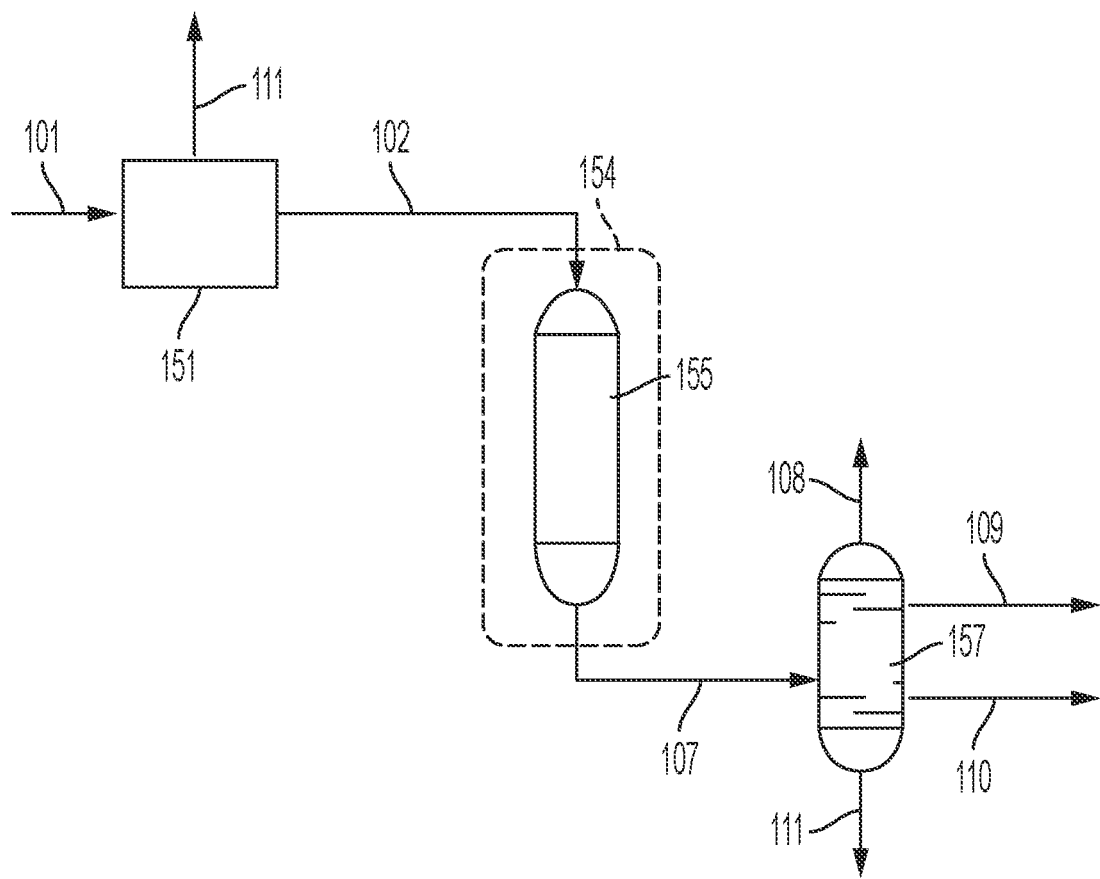
FIG. 1 is a schematic illustration of one or more embodiments of the present disclosure, in which plastic pyrolysis oil produced in the pyrolysis of a plastic feedstock is fed directly to a unitary aromatization unit comprising an aromatization reactor.

Referring first to FIG. 1, a schematic illustration of one or more embodiments of the present disclosure in which a plastic pyrolysis oil produced in the pyrolysis of a plastic feedstock is fed to an aromatization unit is presented. An inlet stream 101 comprising mixed plastics is provided to a plastic pyrolysis unit 151. The plastic pyrolysis unit 151 is in fluid communication with the inlet stream 101 and is operable to generate a stream of plastic pyrolysis oil 102 from the inlet stream 101. An aromatization unit 154 is in fluid communication with the plastic pyrolysis unit 151 and the stream of plastic pyrolysis oil 102 and is operable to generate an aromatic rich stream 107 of aromatized plastic pyrolysis oil. Additionally, an aromatic recovery complex 157 is in fluid communication with the aromatization unit 154 the aromatics rich stream 107 and is operable to separate the aromatics rich stream 107 into a BTX fraction 109, a gasoline blending fraction 110, a gas fraction 108 comprising hydrogen and C1-C4 hydrocarbons, and an aromatic bottoms fraction 111 comprising hydrocarbons boiling above 180° C.

Plastic Feedstock

In one or more embodiments, the inlet stream 101 comprises a plastic feedstock including mixed plastics of differing compositions. The plastic feedstock provided to the plastic pyrolysis unit 151 may be a mixture of plastics from various polymer families. In various embodiments, the plastic feedstock may comprise plastics representative of one or more of the polymer families disclosed in Table 1. Specifically, the plastic feedstock may comprise plastics representative of one or more of polymer families such as olefins polymers, carbonates polymers, aromatics polymers, sulfones polymers, fluorinated hydrocarbon polymers, chlorinated hydrocarbon polymers, and acrylonitriles polymers. Further, the plastic feedstock provided to the plastic pyrolysis unit 151 may be a mixture of high density polyethylene (HDPE, for example, a density of about 0.93 to 0.97 grams per cubic centimeter (g/cm), low density polyethylene (LDPE, for example, about 0.910 g/cm$^3$ to 0.940 g/cm), polypropylene (PP), linear low density polyethylene (LLDPE), polystyrene (PS), polyethylene terephthalate (PET). It will be appreciated that utilization of the mixed plastics feedstock allows for recycling of plastics without necessitating fine sorting of the plastics.

TABLE 1

Example Polymers

| Polymer family | Example polymer | Melting Point, ° C. | Structure |
|---|---|---|---|
| Olefins | Polyethylene (PE) | 115-135 | 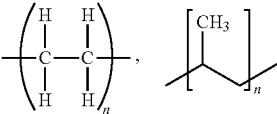 |
| Olefins | Polypropylene (PP) | 115-135 | 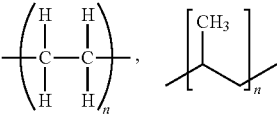 |
| carbonates | diphenylcarbonate | 83 | 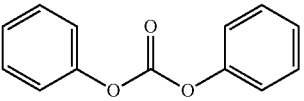 [SMILES: O=C(Oc1ccccc1)Oc1ccccc1] |
| aromatics | Polystyrene (PS) | 240 | 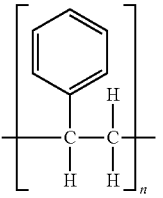 |
| Sulfones | Polyether sulfone | 227-238 | 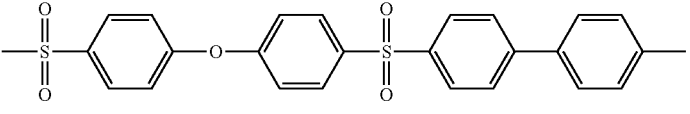 |
| Fluorinated hydrocarbons | Polytetrafluoroethylene (PTFE) | 327 | 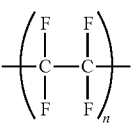 |
| Chlorinated hydrocarbons | Polyvinyl chloride (PVC) | 100-260 | 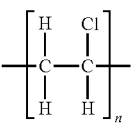 |
| Acrylonitriles | Polyacrylonitrile (PAN) | 300 | 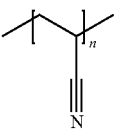 |

The plastics of the inlet stream 101 may be provided in a variety of different forms. The plastics may be in the form of a powder in smaller scale operations. The plastics may be in the form of pellets, such as those with a particle size of from 1 to 5 millimeter (mm) for larger scale operations. In further embodiments, the plastics may be provided as a chopped or ground product. Further, the plastics of the inlet stream 101 may be natural, synthetic or semi-synthetic polymers. In various embodiments, the plastics of the inlet stream 101 may comprise waste plastics, manufacturing off-spec products, new plastic products, unused plastic products, as well as their combinations.

Plastic Pyrolysis

The plastic pyrolysis unit 151 converts the inlet stream 101 of plastics to gaseous and liquid products. The liquid products are provided as an effluent from the plastic pyrolysis unit 151 as the stream of plastic pyrolysis oil 102. The stream of gaseous products is generically shown in each of FIGS. 1, 2, 3, and 4 as off-gas stream 111. The gaseous products in the off-gas stream 111 may include various species such as hydrogen and hydrocarbon gases (C1-C4), carbon monoxide (CO), carbon dioxide ($CO_2$), and other acid gases.

The specific reactor used as the plastic pyrolysis unit 151 can be of different types and are not limited for the purposes of the present disclosure. One skilled in the art will appreciate that typical reactor types that can be used to serve the function of the plastic pyrolysis unit 151 are tank reactors, rotary kilns, packed beds, bubbling and circulating fluidized bed, ebullated-bed, and others. In one or more embodiments, the pyrolysis of the plastic feedstock in the inlet stream 101 is performed in the presence or absence of a catalyst at a temperature of 300 to 1000° C. In various further embodiments, the plastic pyrolysis unit 151 may operate at a low severity at a temperature less than or equal to 450° C., at a high severity at a temperature greater than 450° C., at a temperature of 300 to 450° C., at a temperature of 450 to 1000° C., at a temperature of 450 to 750° C., at a temperature of 600 to 1000° C., or at a temperature of 750 to 1000° C. In various embodiments, the plastic pyrolysis unit 151 may operate at a pressure in the range of 1 to 100 bars, 1 to 50 bars, 1 to 25 bars, or 1 to 10 bars. Further, in various embodiments, the residence time of the plastic feedstock in the plastic pyrolysis unit 151 may be 1 to 3600 seconds, 60 to 1800 seconds, or 60 to 900 seconds.

In one or more embodiments, stream of plastic pyrolysis oil 102 exiting the plastic pyrolysis unit 151 may be mixed with refinery fractions. Specifically, the composition of plastic oil in the stream of plastic pyrolysis oil 102 as fed to the first fractionator 152 may vary from 0.1 weight percent (wt. %) to 100 wt. % with the remainder comprising conventional refinery streams. In various embodiments, the composition of plastic oil in the stream of plastic pyrolysis oil 102 as fed to the first fractionator 152 may comprise 1 to 100 wt. % plastic oil, 20 to 100 wt. % plastic oil, 40 to 100 wt. % plastic oil, 60 to 100 wt. % plastic oil, 80 to 100 wt. % plastic oil, or substantially 100 wt. % plastic oil.

First Fractionator

Figure 2:
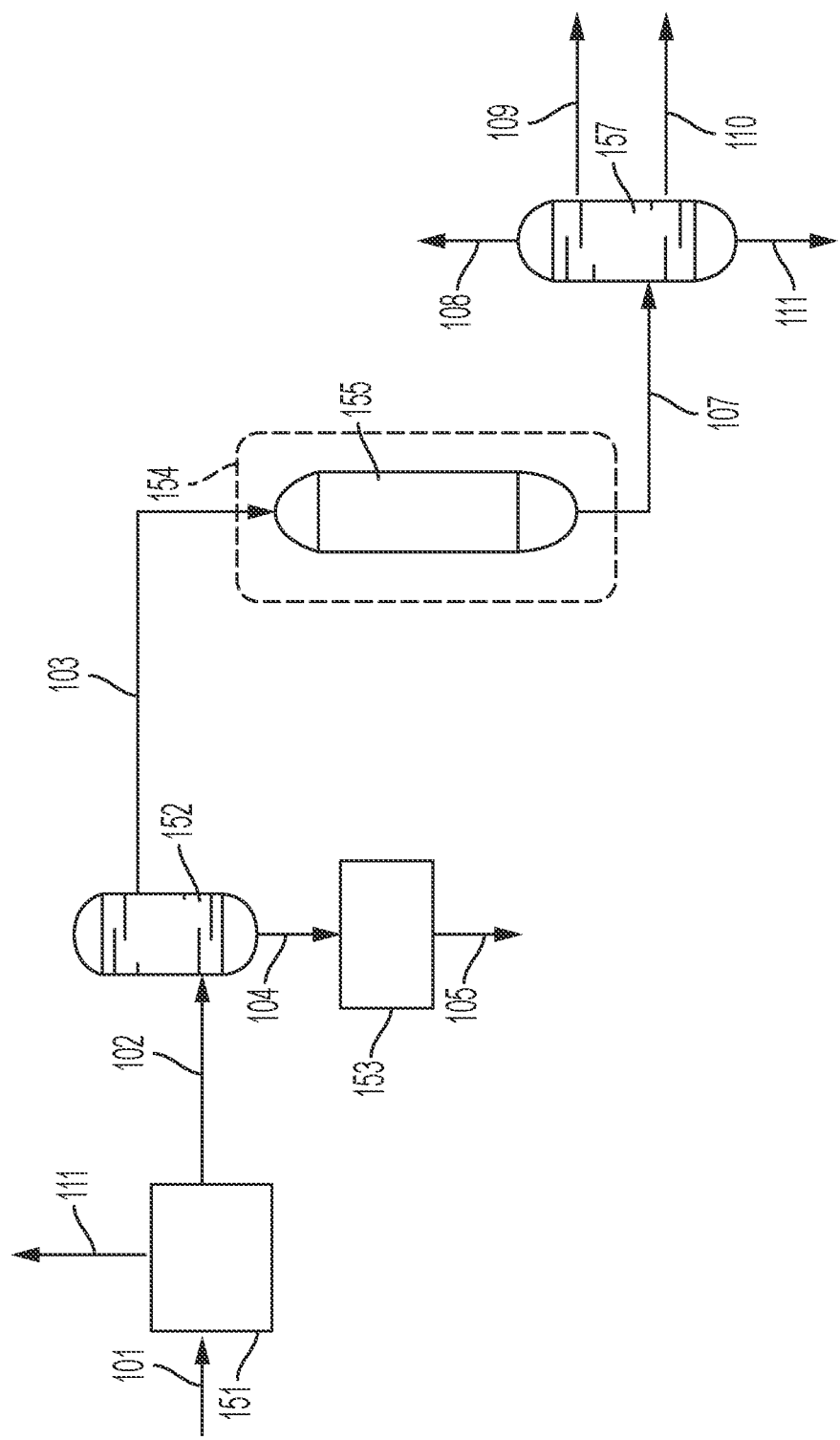
FIG. 2 is a schematic illustration of one or more embodiments of the present disclosure, in which a first distillate fraction which includes hydrocarbons boiling in the range of 36 to 370° C. fractionated from plastic pyrolysis oil produced in the pyrolysis of a plastic feedstock is fed to a unitary aromatization unit comprising an aromatization reactor.
Figure 3:
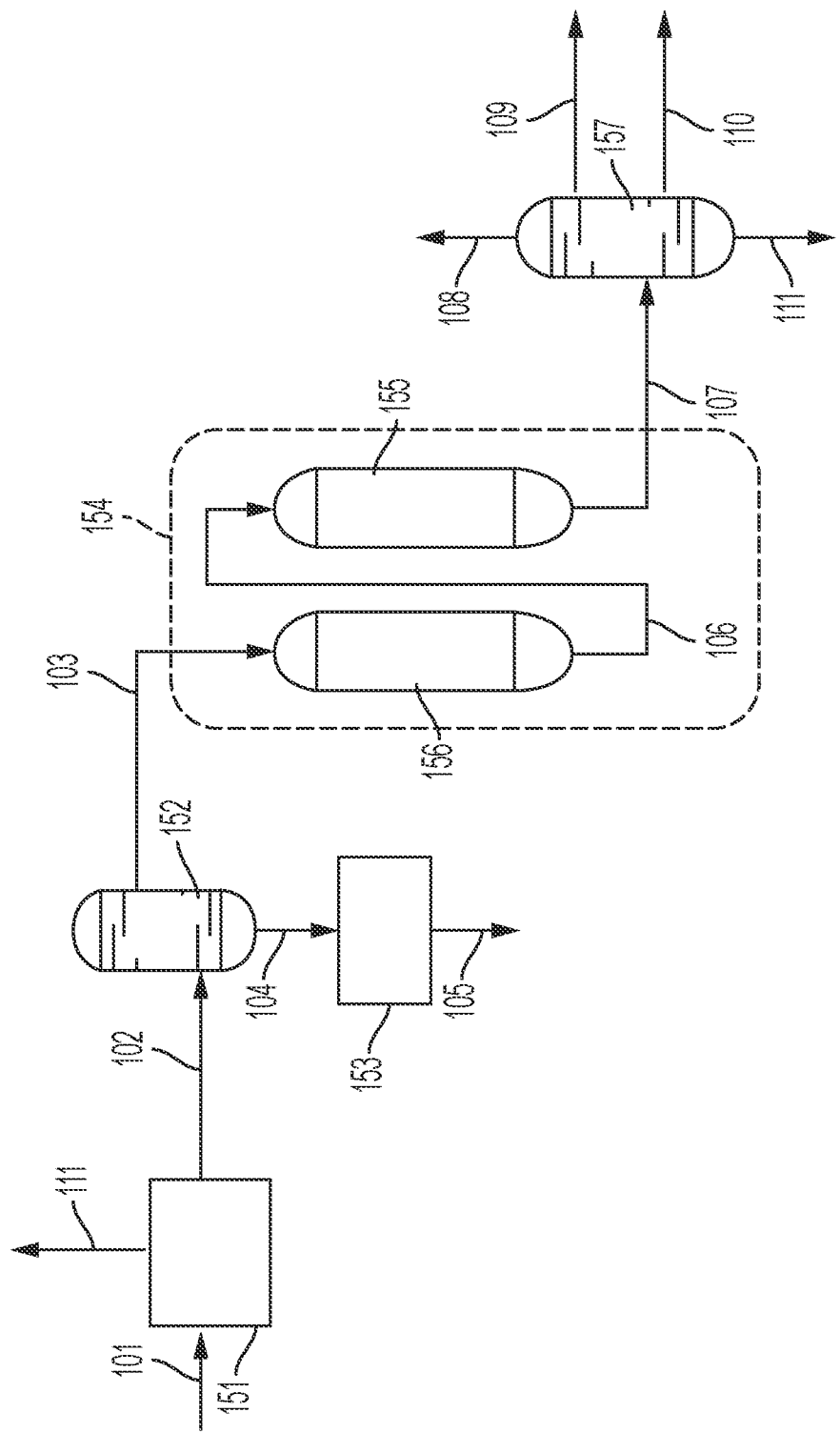
FIG. 3 is a schematic illustration of one or more embodiments of the present disclosure, in which a first distillate fraction which includes hydrocarbons boiling in the range of 36 to 370° C. fractionated from plastic pyrolysis oil produced in the pyrolysis of a plastic feedstock is fed to a unitary aromatization unit comprising a selective hydrogenation unit and an aromatization reactor.

With reference to FIGS. 2 and 3, in one or more embodiments, a first fractionator 152 is provided to separate the stream of plastic pyrolysis oil 102 into a first distillate fraction 103 and a residual heavy fraction 104. The first fractionator 152 is provided in fluid communication with the plastic pyrolysis unit 151 and the stream of plastic pyrolysis oil 102. As such, the first fractionator 152 is also provided in fluid communication with the aromatization unit 154 and the first distillate fraction 103 is provided to the aromatization unit 154 in lieu of an entirety of the stream of plastic pyrolysis oil 102.

Figure 4:
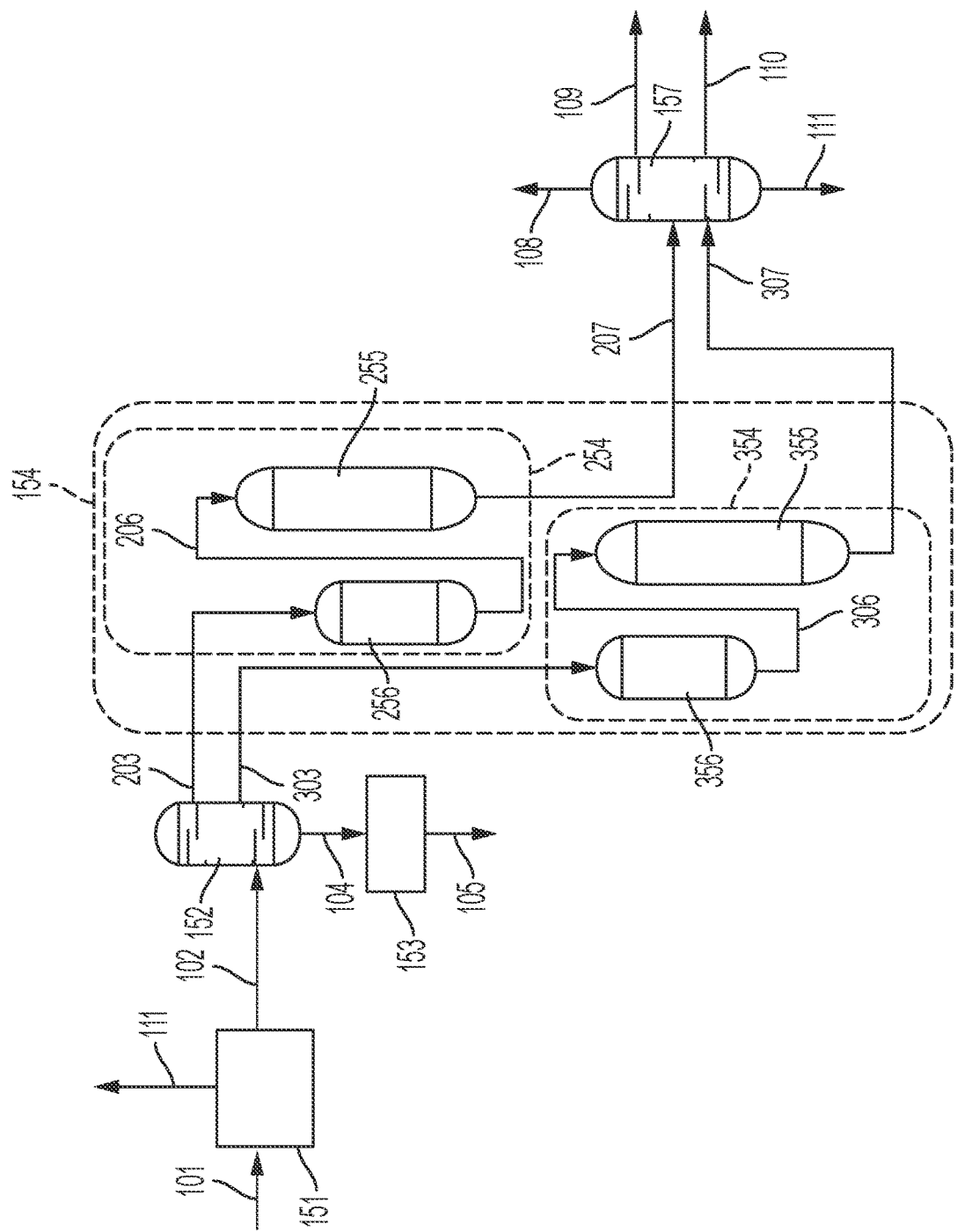
FIG. 4 is a schematic illustration of one or more embodiments of the present disclosure, in which a plastic pyrolysis naphtha stream which includes hydrocarbons boiling in the range of 36 to 110° C. and a plastic pyrolysis second distillate stream which includes hydrocarbons boiling in the range of 110 to 370° C. fractionated from plastic pyrolysis oil produced in the pyrolysis of a plastic feedstock are fed to parallel aromatization units, each comprising a selective hydrogenation unit and an aromatization reactor.

With reference to FIG. 4, in one or more embodiments, the first fractionator 152 is provided to separate the stream of plastic pyrolysis oil 102 into a plastic pyrolysis naphtha stream 203, a plastic pyrolysis second distillate stream 303, and the residual heavy fraction 104. As such, the plastic pyrolysis naphtha stream 203 and the plastic pyrolysis second distillate stream 303 are provided to the aromatization unit 154 in lieu of an entirety of the stream of plastic pyrolysis oil 102.

The first fractionator 152 may comprise any unit operation or system known to those skilled in the art for separating a hydrocarbon stream by vapor pressure. An example fractionation unit is an atmospheric distillation unit. An atmospheric distillation unit utilizes fractional distillation by heating the feed to a temperature at which one or more fractions of the mixture will vaporize while leaving other fractions as liquid to separate the feed stream. Further, in various embodiments, the first fractionator 152 may be a simple flash column or true boiling point distillation with at least 15 theoretical plates. In one or more embodiments and with reference to FIGS. 2 and 3, the first fractionator 152 separates the stream of plastic pyrolysis oil 102 into the first distillate fraction 103 including hydrocarbons boiling in the range of 36 to 370° C. and the residual heavy fraction 104 comprising hydrocarbons boiling above 370° C. In one or more embodiments and with reference to FIG. 4, the first fractionator 152 separates the stream of plastic pyrolysis oil 102 into the plastic pyrolysis naphtha stream 203 including hydrocarbons boiling in the range of 36 to 110° C., the plastic pyrolysis second distillate stream 303 including hydrocarbons boiling in the range of 110 to 370° C., and the residual heavy fraction 104 comprising hydrocarbons boiling above 370° C. In various embodiments, the plastic pyrolysis naphtha stream 203 and the plastic pyrolysis second distillate stream 303 are separated based on fractionation at a hydrocarbon boiling point of 80 to 90° C. commensurate with C6 naphtha, 110 to 120° C. commensurate with C7 naphtha, 135 to 145° C. commensurate with C8 naphtha, approximately 85° C., approximately 116° C., or approximately 140° C.

It is noted that when the plastic feedstock includes polymers that contain sulfur, chlorine, or fluorine, the plastic pyrolysis oil 102 may be hydrotreated to remove such heteroatoms. The pretreatment may be completed before or after the first fractionator 152, if present.

Aromatization Unit

An aromatization unit 154 is provided which is operable to convert one or more nonaromatic precursors into aromatics to generate a stream with increased aromatic content. In accordance with the various embodiments, the aromatization unit 154 may be provided in various configurations. In accordance with each configuration, the aromatization unit 154 includes at least one aromatization reactor with an aromatization catalyst disposed therein operable to generate a liquid product stream with increased aromatics content. With reference to FIG. 1, in one or more embodiments, the aromatization unit 154 is provided in fluid communication with the stream of plastic pyrolysis oil 102. In one or more further embodiments, and with reference to FIGS. 2 and 3, the aromatization unit 154 is provided in fluid communication with the first distillate fraction 103 generated by the first fractionator 152. In yet one or more further embodiments, and with reference to FIG. 4, where the first distillate fraction is further separated into the plastic pyrolysis naphtha stream 203 and the plastic pyrolysis second distillate stream 303, the aromatization unit 154 is provided as the naphtha aromatization unit 254 in fluid communication with the plastic pyrolysis naphtha stream 203 generated by the first fractionator 152 and as the second distillate aromatization unit 354 in fluid communication with the plastic pyrolysis second distillate stream 303 generated by the first fractionator 152.

In accordance with the system configuration as illustrated in FIG. 1 where the plastic pyrolysis oil 102 is passed directly to the aromatization unit 154, the plastic pyrolysis oil 102 is converted to the aromatic rich stream 107 in an aromatization reactor 155 provided as part of the aromatization unit 154.

In accordance with the system configuration as illustrated in FIGS. 2 and 3 where the first fractionator 152 is positioned in the flow path between the plastic pyrolysis unit 151 and the aromatization unit 154, the first distillate fraction 103 is converted to the aromatic rich stream 107 in the aromatization unit 154. Specifically, in accordance with FIG. 2, the first distillate fraction 103 may be directly converted to the aromatic rich stream 107 in an aromatization reactor 155 provided as part of the aromatization unit 154. Similarly, in accordance with FIG. 3, the first distillate fraction 103 may be converted to the aromatic rich stream 107 in a two-step operation comprising di-olefin removal in a selective hydrogenation unit 156 followed by aromatization in the aromatization reactor 155 provided as sub-units of the aromatization unit 154.

In accordance with the system configuration as illustrated in FIG. 4 where the first fractionator 152 provides the separate plastic pyrolysis naphtha stream 203 and plastic pyrolysis second distillate stream 303 and is positioned in the flow path between the plastic pyrolysis unit 151 and the aromatization unit 154, the plastic pyrolysis naphtha stream 203 is converted to a first aromatic rich stream 207 in the naphtha aromatization unit 254 and the plastic pyrolysis second distillate stream 303 is converted to a second aromatic rich stream 307 in the second distillate aromatization unit 354. Specifically, the plastic pyrolysis naphtha stream 203 may be converted to the first aromatic rich stream 207 in a two-step operation comprising di-olefin removal in a naphtha selective hydrogenation unit 256 followed by aromatization in a naphtha aromatization reactor 255 provided as sub-units of the naphtha aromatization unit 254. Similarly, the plastic pyrolysis second distillate stream 303 may be converted to the second aromatic rich stream 307 in a two-step operation comprising di-olefin removal in a second distillate selective hydrogenation unit 356 followed by aromatization in a second distillate aromatization reactor 355 provided as sub-units of the second distillate aromatization unit 354.

The catalytic bed reactor of the aromatization unit 154, provided as the aromatization reactor 155, the naphtha aromatization reactor 255, or the second distillate aromatization reactor 355 in accordance with various embodiments, may operate as a fixed bed reactor in one or more embodiments. In further embodiments, the catalytic bed reactor of the aromatization unit 154 may operate as a moving bed reactor.

The aromatization catalyst may be selected to efficiently aromatize the feed stream to the aromatization unit 154. Specifically, the aromatization catalyst may be selected to efficiently aromatize the plastic pyrolysis oil stream 102 from the plastic pyrolysis unit 151 in accordance with the embodiments of FIG. 1, to efficiently aromatize the first distillate fraction 103 from the first fractionator 152 in accordance with the embodiments of FIGS. 2 and 3, and to efficiently aromatize the plastic pyrolysis naphtha stream 203 from the first fractionator 152 and the plastic pyrolysis second distillate stream 303 from the first fractionator 152 in accordance with the embodiment of FIG. 4. It will be appreciated that the aromatization catalyst may be selected to optimize performance based on if the feed stream to the aromatization unit 154 is the plastic pyrolysis oil stream 102 from the plastic pyrolysis unit 151, the first distillate fraction 103 from the first fractionator 152, the plastic pyrolysis naphtha stream 203 from the first fractionator 152, or the plastic pyrolysis second distillate stream 303 from the first fractionator 152.

In one or more embodiments, the aromatization catalyst comprises a shape selective zeolite. In various embodiments, the shape selective zeolite may be selected from medium pore zeolite such as pentasil-type ZSM-5 zeolite, large pore zeolite such as zeolite omega and SAPO-5 zeolite, small pore zeolite such as SAPO-34 zeolite, mesoporous zeolite such as SAPO-11 zeolite, and combinations thereof.

It will be appreciated that while zeolite is the active phase of the aromatization catalyst pure zeolite can't be formed into a catalyst particle. As such, in one or more embodiments, the zeolite content of the aromatization catalyst may range from 5 wt. % to 80 wt. % with binders and other components forming the remainder of the aromatization catalyst. In various further embodiments, the aromatization catalyst comprises from 5 wt. % to 70 wt. % zeolite, from 5 wt. % to 60 wt. % zeolite, from 10 wt. % to 80 wt. % zeolite, from 20 wt. % to 80 wt. % zeolite, or from 30 wt. % to 50 wt. % zeolite.

In accordance with various embodiments, the aromatization catalyst may include a metal oxide component dispersed on the surfaces of a zeolite support. The metal oxide component may include one or more oxides of metal elements selected from groups 4 to 13 of the International Union of Pure and Applied Chemistry (IUPAC) periodic table, such as groups 8 to 13 of the IUPAC periodic table. In one or more embodiments, the metal element of the one or more metal oxides may be a metal element selected from groups 4 to 13 and periods 4 to 6 of the IUPAC periodic table, such as period 4 of the periodic table. The metal element of the metal oxide may include, but is not limited to, titanium, vanadium, chromium, manganese, iron, cobalt, nickel, copper, zinc, gallium, zirconium, molybdenum, palladium, silver, hafnium, tungsten, platinum, gold, or combinations of these metal elements. In one or more embodiments, the metal element of the one or more metal oxides may include zinc, zirconium, gallium, or combinations of these metals. In one or more embodiments, the metal oxide may be gallium oxide.

In one or more embodiments the aromatization catalyst may comprise a gallium modified H-MFI type zeolite. Specifically, the aromatization catalyst may comprise a catalyst formed from gallium incorporated into an H-MFI type zeolite. Such a catalyst may comprise from 1 to 5 weight percent gallium (Ga) based on the total catalyst. For example, in various embodiments, the gallium modified H-MFI type zeolite catalyst may comprise from 1 to 4 weight percent gallium, 1 to 3 weight percent gallium, 1.5 to 2.5 weight percent gallium, 1.8 to 2.2 weight percent gallium, or approximately 2 weight percent gallium. It will be appreciated that integration of gallium at other ratios encompassed by the broadest ranges are also envisioned but not explicitly delineated for brevity. As previously indicted, in various embodiments, the gallium may be substituted with an alternative metal element while maintaining the remaining parameters of the disclosed gallium modified H-MFI type zeolite. In various embodiments, the silica to alumina ratio of the H-MFI type zeolite may vary from 20 to 100, 20 to 80, 20 to 50, or 20 to 30.

In one or more embodiments and in accordance with the various configurations, the plastic pyrolysis oil stream 102 from the plastic pyrolysis unit 151, the first distillate fraction 103 from the first fractionator 152, the plastic pyrolysis naphtha stream 203 from the first fractionator 152, or the plastic pyrolysis second distillate stream 303 from the first fractionator 152 is provided to the aromatization unit 154 at a liquid space velocity (LHSV) of 0.5 to 5 $h^{-1}$. In various further embodiments, the plastic pyrolysis oil stream 102, the first distillate fraction 103, the plastic pyrolysis naphtha stream 203, or the plastic pyrolysis second distillate stream 303 is provided to the aromatization unit 154 at a LHSV of 0.5 to 4 $h^{-1}$, 0.5 to 3 $h^{-1}$, 0.5 to 2 $h^{-1}$, 0.8 to 2 $h^{-1}$, 1 to 2 $h^{-1}$, or approximately 1 $h^{-1}$. It will be appreciated that greater LHSV results in low aromatics yield while lesser LHSV favors formation of less desirable heavy aromatics.

In one or more embodiments and in accordance with the various configurations, the aromatization reactor 155, the naphtha aromatization reactor 255, or the second distillate aromatization reactor 355 may be operated at a reaction temperature of 450 to 600° C. In various embodiments, the aromatization reactor 155, the naphtha aromatization reactor 255, or the second distillate aromatization reactor 355 may be operated at a reaction temperature of 450 to 575° C., 500 to 600° C., 500 to 550° C., or approximately 550° C. It will be appreciated that lesser temperature leads to lesser conversion while greater temperature results in faster catalyst deactivation.

In one or more embodiments and in accordance with the various configurations, the second reactor 20 may be operated at a pressure of 1 to 5 bar, 1 to 4 bar, 1 to 3 bar, or approximately 1 bar. It will be appreciated that lesser pressure favors aromatization reaction, but a minimum level of positive pressure is needed for practical operation.

Selective Hydrogenation Unit

In one or more embodiments and with reference to FIG. 3, the aromatization unit 154 further comprises a selective hydrogenation unit 156 configured and operated to remove di-olefins by hydrogenation from the first distillate fraction 103 to produce a first product stream of dediolefinized plastic pyrolysis first distillate 106. As such, the dediolefinized plastic pyrolysis first distillate 106 is provided to the aromatization reactor 155 to generate the aromatics rich stream 107. It will be appreciated that in one or more embodiments di-olefins are removed completely from the first distillate fraction 103. For purposes of the present disclosure the term "removed completely" means di-olefins were reduced to less than 1 weight percent, less than 0.1 weight percent, less than 0.01 weight percent, less than 0.001 weight percent, or less than 0.0001 weight percent.

In one or more embodiments, the selective hydrogenation unit 156 may be a fixed bed reactor in combination with any known hydrogenation catalyst. However, the selective hydrogenation unit 156 is not intended to be limited to any specific type of reactor.

In one or more embodiments, the selective hydrogenation unit 156 includes a first hydrogenation catalyst. The first hydrogenation catalyst may comprise a nickel catalyst on one or more of an alumina support, a silica support, and a titania support. For example, the first hydrogenation catalyst may comprise nickel catalyst on an alumina support or nickel-molybdenum (Ni—Mo) catalyst in an alumina support.

In one or more embodiments, the selective hydrogenation unit 156 is operated at a temperature of 150 to 210° C. In various further embodiments, the selective hydrogenation unit 156 is operated at a temperature of 150 to 200° C., 150 to 190° C., 150 to 180° C., or approximately 175° C.

In one or more embodiments, the selective hydrogenation unit 156 is operated at a hydrogen pressure at the inlet of 10 to 25 bar. In various further embodiments, the selective hydrogenation unit 156 is operated at a hydrogen pressure at the inlet of 10 to 25 bar, 12 to 22 bar, 15 to 20 bar, or approximately 17 bar.

In one or more embodiments, the selective hydrogenation unit 156 is operated at a liquid hourly space velocity (LHSV) of 1 to 5 inverse hours ($h^{-1}$). In various further embodiments, the selective hydrogenation unit 156 is operated at an LHSV of 1 to 4 hW, 1 to 3 $h^{-1}$, or approximately 2 h.

In one or more embodiments, the selective hydrogenation unit 156 is operated at a hydrogen to oil ratio of 50 to 300 standard cubic meters per cubic meter ($Sm^3/m^3$). One skilled in the art will appreciate that standard cubic meters are measured at a temperature of 15° C. and pressure of 1.01325 bar. In various further embodiments, the selective hydrogenation unit 156 is operated at a hydrogen to oil ratio of 60 to 250 $Sm^3/m^3$, 65 to 180 $Sm^3/m^3$, 70 to 110 $Sm^3/m^3$, or 70 to 90 $Sm^3/m^3$.

In one or more embodiments and with reference to FIG. 4, where the first fractionator 152 further separates the first distillate fraction into a plastic pyrolysis naphtha stream 203 and a plastic pyrolysis second distillate stream 303 which are provided to the naphtha aromatization unit 254 and the second distillate aromatization unit 354 respectively, each of the naphtha aromatization unit 254 and the second distillate aromatization unit 354 may include an associated selective hydrogenation unit. Specifically, the naphtha aromatization unit 254 further comprises a naphtha selective hydrogenation unit 256 configured and operated to remove di-olefins by hydrogenation from the plastic pyrolysis naphtha stream 203 to produce a second product stream of dedioletinized plastic pyrolysis naphtha 206. As such, the dediolefinized plastic pyrolysis naphtha 206 is provided to the naphtha aromatization reactor 255 to generate the first aromatic rich stream 207. Similarly, the second distillate aromatization unit 354 further comprises a second distillate selective hydrogenation unit 356 configured and operated to remove di-olefins by hydrogenation from the plastic pyrolysis second distillate stream 303 to produce a third product stream of dediolefinized plastic pyrolysis second distillate 306. As such, the dediolefinized plastic pyrolysis second distillate 306 is provided to the second distillate aromatization reactor 355 to generate the second aromatic rich stream 307. The first aromatic rich stream 207 and the second aromatic rich stream 307 are provided in fluid communication with the aromatic recovery complex 157 in lieu of the aromatic rich stream 107.

It will be appreciated that in one or more embodiments di-olefins are removed completely from the plastic pyrolysis naphtha stream 203. Similarly, it will be appreciated that in one or more embodiments di-olefins are removed completely from the plastic pyrolysis second distillate stream 303. For purposes of the present disclosure the term "removed completely" means di-olefins were reduced to less than 1 weight percent, less than 0.1 weight percent, less than 0.01 weight percent, less than 0.001 weight percent, or less than 0.0001 weight percent.

In one or more embodiments, the naphtha selective hydrogenation unit 256 may be a fixed bed reactor in combination with any known hydrogenation catalyst and the second distillate selective hydrogenation unit 356 may also be a fixed bed reactor in combination with any known hydrogenation catalyst. However, the naphtha selective hydrogenation unit 256 and the second distillate selective hydrogenation unit 356 are not intended to be limited to any specific type of reactor.

In one or more embodiments, the naphtha selective hydrogenation unit 256 includes a second hydrogenation catalyst. The second hydrogenation catalyst may comprise a nickel catalyst on one or more of an alumina support, a silica support, and a titania support. For example, the second hydrogenation catalyst may comprise nickel catalyst on an alumina support or nickel-molybdenum (Ni—Mo) catalyst in an alumina support.

Similarly, in one or more embodiments, the second distillate selective hydrogenation unit 356 includes a third hydrogenation catalyst. The third hydrogenation catalyst may comprise a nickel catalyst on one or more of an alumina support, a silica support, and a titania support. For example, the third hydrogenation catalyst may comprise nickel catalyst on an alumina support or nickel-molybdenum (Ni—Mo) catalyst in an alumina support.

In various embodiments, the first hydrogenation catalyst, the second hydrogenation catalyst, and the third hydrogenation may be the same or different. For example, the second hydrogenation catalyst may be the same as the third hydrogenation catalyst in one or more embodiments but different in one or more further embodiments.

In one or more embodiments, the naphtha selective hydrogenation unit 256 is operated at a temperature of 150 to 210° C. In various further embodiments, the naphtha selective hydrogenation unit 256 is operated at a temperature of 150 to 200° C., 150 to 190° C., 150 to 180° C., or approximately 175° C.

In one or more embodiments, the second distillate selective hydrogenation unit 356 is operated at a temperature of 150 to 210° C. In various further embodiments, the second distillate selective hydrogenation unit 356 is operated at a temperature of 150 to 200° C., 150 to 190° C., 150 to 180° C., or approximately 175° C.

In one or more embodiments, the naphtha selective hydrogenation unit 256 is operated at a hydrogen pressure at the inlet of 10 to 25 bar. In various further embodiments, the naphtha selective hydrogenation unit 256 is operated at a hydrogen pressure at the inlet of 10 to 25 bar, 12 to 22 bar, 15 to 20 bar, or approximately 17 bar.

In one or more embodiments, the second distillate selective hydrogenation unit 356 is operated at a hydrogen pressure at the inlet of 10 to 25 bar. In various further embodiments, the second distillate selective hydrogenation unit 356 is operated at a hydrogen pressure at the inlet of 10 to 25 bar, 12 to 22 bar, 15 to 20 bar, or approximately 17 bar.

In one or more embodiments, the naphtha selective hydrogenation unit 256 is operated at a liquid hourly space velocity (LHSV) of 1 to 5 inverse hours (h). In various further embodiments, the naphtha selective hydrogenation unit 256 is operated at an LHSV of 1 to 4 $h^{-1}$, 1 to 3 $h^{-1}$, or approximately 2 $h^{-1}$.

In one or more embodiments, the second distillate selective hydrogenation unit 356 is operated at a liquid hourly space velocity (LHSV) of 1 to 5 inverse hours (h). In various further embodiments, the second distillate selective hydrogenation unit 356 is operated at an LHSV of 1 to 4 $h^{-1}$, 1 to 3 $h^{-1}$, or approximately 2 $h^{-1}$.

In one or more embodiments, the naphtha selective hydrogenation unit 256 is operated at a hydrogen recycle rate of 50 to 300 standard cubic meters per cubic meter ($Sm^3/m^3$). One skilled in the art will appreciate that standard cubic meters are measured at a temperature of 15° C. and pressure of 1.01325 bar. In various further embodiments, the naphtha selective hydrogenation unit 256 is operated at a hydrogen recycle rate of 60 to 250 $Sm^3/m^3$, 65 to 180 $Sm^3/m^3$, 70 to 110 $Sm^3/m^3$, or 70 to 90 $Sm^3/m^3$.

In one or more embodiments, the second distillate selective hydrogenation unit 356 is operated at a hydrogen recycle rate of 50 to 300 standard cubic meters per cubic meter ($Sm^3/m^3$). One skilled in the art will appreciate that standard cubic meters are measured at a temperature of 15° C. and pressure of 1.01325 bar. In various further embodiments, the second distillate selective hydrogenation unit 356 is operated at a hydrogen recycle rate of 60 to 250 $Sm^3/m^3$, 65 to 180 $Sm^3/m^3$, 70 to 110 $Sm/m^3$, or 70 to 90 $Sm^3/m^3$.

Aromatic Recovery Complex

In one or more embodiments, the aromatic rich stream 107 is passed to the aromatic recovery complex 157 to separate the aromatic rich stream 107 into the BTX fraction 109, the gasoline blending fraction 110, the gas fraction 108, and the aromatic bottoms fraction 111. The BTX fraction 109 consists of benzene, toluene and mixed xylenes. The gas fraction 108 comprises hydrogen and C1-C4 hydrocarbons. The aromatic bottoms fraction 111 comprises hydrocarbons boiling above 180° C. The gasoline blending fraction 110 comprises aliphatic hydrocarbons with a boiling range from C5 hydrocarbons up to the aromatic bottoms fraction 111.

Various systems and techniques may be utilized in the aromatics recovery complex 157 for separating the aromatics rich stream 107 into various fractions and the present disclosure is not intended to be limited in nature to the specific arrangement of the aromatics recovery complex 157. Generally, the aromatics recovery complex 157 produces the aromatics rich stream 107 into the BTX fraction 109, the gasoline blending fraction 110, the gas fraction 108, and the aromatic bottoms fraction 111. While the BTX fraction 109 is illustrated as a single stream for reduced complexity in each of the Figures, it will be appreciated that the BTX fraction 109 may be further separated into individual steams of benzene, toluene and mixed xylenes within the aromatics recovery complex 157.

There are many configurations of aromatics recovery complexes in general. In one or more embodiments, the aromatics recovery complex 157 may include, for example, a dehexanizer distillation column that removes lighter components and discharges a bottoms product stream. The bottoms product stream may be fed to a benzene distillation column that removes benzene overhead and discharges a bottoms stream having, for example, toluene, mixed xylenes, ethyl benzene, and C9+ aromatic compounds. In some instances, the overhead discharge may enter absorber and stripper columns to purify the benzene. The bottoms stream from the benzene distillation column may be processed in absorber and stripper columns to remove light components and further in distillation columns. The aforementioned absorber and stripper columns may involve solvent extraction.

This bottoms stream from the benzene distillation column may ultimately be processed in distillation columns to separate and recover toluene and various mixed xylenes. The distillation columns may include a toluene distillation column(s) and a xylene distillation column(s). A toluene distillation column may separate and discharge toluene overhead. The xylene distillation column may receive the bottoms discharge from the toluene distillation column, separate and discharge mixed xylenes overhead and discharge a heavy aromatics (C9+) bottoms stream, such as the aromatic bottoms fraction 111.

With reference to FIGS. 3 and 4, in one or more embodiments, a pretreater (not shown) is provided to remove contaminants from the stream of plastic pyrolysis oil 102. Specifically, the pretreater may remove sulfur (S), nitrogen (N), oxygen (O), chlorine (Cl), or combinations of the same from the stream of plastic pyrolysis oil 102. The pretreater may be a conventional hydrotreating system configured to remove the hydrocarbons with heteroatoms. Further, dechlorination may be achieved in the pretreater with ammonium chloride formed in the reaction water washed after the hydrotreating system. It is noted that water washing removes ammonium sulfide formed between hydrogen sulfide and ammonia in addition to the ammonium chloride formed.

In one or more embodiments, the pretreater is positioned subsequent to the first fractionator 152, if present, to remove contaminants from one or more of the first distillate fraction 103, the plastic pyrolysis naphtha stream 203, and the plastic pyrolysis second distillate stream 303 prior to introduction to the aromatization unit 154.

Removal of contaminants is desirable as nitrogen-containing species can poison the aromatization catalyst, chlorine causes metallurgical issue and therefore must meet the design specification of the processing units, and sulfur removal is desirable to meet final fuel specifications.

In one or more embodiments, the residual heavy fraction 104 comprising hydrocarbons boiling above 370° C. is provided to a demetallization operation 153 to remove metallic constituents from the residual heavy fraction 104 and generate a demetallized residual heavy fraction stream 105.

In one or more embodiments, the demetallization operation 153 may be catalytic hydrodemetallization. U.S. Pat. No. 8,491,779, incorporated by reference, teaches the integration of catalytic hydrodemetallization (HDM) into a refinery process. The HDM step is carried out in the presence of a catalyst and hydrogen. Further, in one or more embodiments, the hydrogen that is used can come from a downstream step. The HDM is generally carried out at 370 to 415° C. and pressure of 30 to 200 bars. Also, see U.S. Pat. No. 5,417,846, incorporated by reference, teaching HDM, as well as U.S. Pat. Nos. 4,976,848; 4,657,664; 4,166,026; and 3,891,541, all of which are incorporated by reference.

In one or more embodiments, the demetallization operation 153 may be solvent deasphalting. The process of solvent deasphalting results in the metal containing hydrocarbons of the processed streaming end up in an asphaltenes stream of a solvent deasphalting unit. U.S. Pat. No. 7,566,394, incorporated by reference, teaches details of a solvent deasphalting process.

Having described the system for processing mixed plastics into plastic pyrolysis products, it is expressly indicated that the associated method of producing pyrolysis products from a mixed plastics stream using the same is also envisioned. The method includes conducting pyrolysis of a plastic feedstock to produce a stream of plastic pyrolysis oil 102, feeding the plastic pyrolysis oil 102 to an aromatization unit 154 comprising an aromatization reactor 155 with an aromatization catalyst disposed therein to generate an aromatics rich stream 107, and passing the aromatics rich stream 107 to an aromatics recovery complex 157 to separate the aromatics rich stream 107 into a BTX fraction 109, a gasoline blending fraction 110, a gas fraction 108 comprising hydrogen and C1-C4 hydrocarbons, and an aromatic bottoms fraction 111 comprising hydrocarbons boiling above 180° C. The BTX fraction 109 consists of benzene, toluene and mixed xylenes and the gasoline blending fraction 110 comprises aliphatic hydrocarbons with a boiling range from C5 hydrocarbon up to the aromatic bottoms fraction.

The method of producing pyrolysis products from a mixed plastics stream may also include feeding the plastic pyrolysis oil 102 to a first fractionator 152 to separate the plastic pyrolysis oil 102 into a first distillate fraction 103 including hydrocarbons boiling in the range of 36 to 370° C. and a residual heavy fraction 104 comprising hydrocarbons boiling above 370° C. In such arrangement, the method includes feeding the first distillate fraction 103 to the aromatization unit in lieu of an entirety of the plastic pyrolysis oil 102. The first fractionator may further separate the first distillate fraction 103 into a plastic pyrolysis naphtha stream 203 and a plastic pyrolysis second distillate stream 303. In such arrangement the aromatization unit is split into a naphtha aromatization unit 254 comprising a naphtha aromatization reactor 255 fed by the plastic pyrolysis naphtha stream 203 and a second distillate aromatization unit 354 comprising a second distillate aromatization reactor 355 fed by the plastic pyrolysis second distillate stream 303.

In accordance with one or more embodiments of a method of producing pyrolysis products from a mixed plastics stream the aromatization unit 154 may further comprises a selective hydrogenation unit 156 configured and operated to remove di-olefins by hydrogenation from the first distillate fraction 103 to produce a first product stream of dediolefinized plastic pyrolysis first distillate 106. In accordance with such arrangement the dediolefinized plastic pyrolysis first distillate 106 is provided to the aromatization reactor 155 to generate the aromatic rich stream 107.

Further, in accordance with one or more embodiments of a method of producing pyrolysis products from a mixed plastics stream the naphtha aromatization unit 254 may further comprises a naphtha selective hydrogenation unit 256 configured and operated to remove di-olefins by hydrogenation from the plastic pyrolysis naphtha stream 203 to produce a second product stream of dediolefinized plastic pyrolysis naphtha 206. Similarly, the second distillate aromatization unit 354 may further comprises a second distillate selective hydrogenation unit 356 configured and operated to remove di-olefins by hydrogenation from the plastic pyrolysis second distillate stream 303 to produce a third product stream of dediolefinized plastic pyrolysis second distillate 306. In accordance with such arrangement the dediolefinized plastic pyrolysis naphtha 206 is provided to the naphtha aromatization reactor 255 to generate a first aromatics rich stream 207 and the dediolefinized plastic pyrolysis second distillate 306 is provided to the second distillate aromatization reactor 355 to generate a second aromatics rich stream 307 with the first aromatic rich stream 207 and the second aromatics rich stream 307 provided to the aromatics recovery complex 157 in lieu of the aromatics rich stream 107.

In one or more embodiments, the system for processing of mixed plastics into plastic pyrolysis products may be integrated with a conventional refinery and other refining processes. For purposes of this disclosure a conventional refinery is meant as to reference an existing refining operation for processing crude oil into a plurality of useful products.

In one or more embodiments, integration with the conventional refinery may further include providing the demetallized residual heavy fraction stream 105 to one or more of a residual heavy fraction selective hydrogenation unit, a hydrocracking unit, and a residue hydroprocessing unit provided in the conventional refinery. Details of such systems are not provided for conciseness, but are known to those skilled in the art.

In one or more embodiments, integration with the conventional refinery may further include providing the residual heavy fraction 104 from the first fractionator 152 directly to one or more of a delayed coking unit, a gasification unit, and a solvent desphalting unit provided in the conventional refinery without preprocessing in the demetallization operation 153. Details of such systems are not provided for conciseness, but are known to those skilled in the art.

Examples

The following examples illustrate features of the present disclosure but are not intended to limit the scope of the disclosure.

To demonstrate the utility of the methods of producing pyrolysis products from a mixed plastics stream in accordance with the present disclosure representative testing was completed. Specifically, a BTX fraction 109, a gasoline blending fraction 110, a gas fraction 108, and an aromatic bottoms fraction 111 were generated in accordance with embodiments of the present disclosure.

A plastic feed comprising a mixture of HDPE, LDPE, PP, LLDPE, PS, and PET was provided to a plastic pyrolysis unit 151 and processed to generate a stream of plastic pyrolysis oil 102 in accordance with the present disclosure. The properties and composition of the plastic pyrolysis oil 102 are shown in Tables 2, 3, and 4.

TABLE 2

Example Plastic Pyrolysis Oil Composition

| Property/Composition | Unit | Value |
|---|---|---|
| Density | kg/m$^3$ | 790 |
| Chlorine | ppmw | 130 |
| Nitrogen | ppmw | 1139 |
| Sulfur | ppmw | 82 |
| Oxygen | ppmw | 1562 |
| Metals | ppmw | 65 |
| Di-olefins | W % | 9.4 |
| Mono-Olefins | W % | 50.0 |

TABLE 3

Example Plastic Pyrolysis Oil Composition

| Composition | Unit | Value |
|---|---|---|
| Naphtha (36-110° C.) | W % | 14.0 |
| Second Distillate (110-370° C.) | W % | 75.6 |
| Residual Heavy Fraction (370° C.+) | W % | 10.4 |

TABLE 4

Example Plastic Pyrolysis Oil Naphtha Composition

| C# | Iso Paraffin | N- Paraffin | Mono- Olefin | Aromatic | Di- olefin | Total |
|---|---|---|---|---|---|---|
| 5 | 9.70 | 0.09 | 0.00 | 3.92 | 0.00 | 0.71 | 14.42 |
| 6 | 9.43 | 0.56 | 0.00 | 27.71 | 4.66 | 0.49 | 42.86 |
| 7 | 15.32 | 1.83 | 0.00 | 16.63 | 8.94 | 0.00 | 42.72 |
| Total | 34.45 | 2.48 | 0.00 | 48.26 | 13.60 | 1.20 | 100.00 |

After pyrolysis, the generated plastic pyrolysis oil was aromatized in a fixed-bed unit in accordance with embodiments of the present disclosure. Specifically, the plastic pyrolysis oil was provided to a fixed bed aromatization reactor loaded with a gallium doped HZSM-5 zeolite catalyst having a silica to alumina ratio of 30. The aromatization reactor was operated at 550° C. and WHSV of 1 hr$^{-1}$ for 5 hours. The specific operating conditions are provided in Table 5. At operating hours 2, 3, 4, and 5 samples of the effluent from the aromatization reactor representative of the aromatic rich stream 107 were measured to with PIONA analysis via gas chromatography to determine their composition. The composition of the effluent after 2 hours, 3 hours, 4, hours, and 5 hours is provided in Table 6.

TABLE 5

Aromatization Reactor Operating Conditions

| Parameter | unit | value |
|---|---|---|
| Temperature | ° C. | 550 |
| Pressure | Bar | 1 |
| WHSV | hr$^{-1}$ | 1 |
| Catalyst | | gallium doped HZSM-5 zeolite |

TABLE 6

Product yields from aromatization reactor testing

| Time on Stream | 2 hours | 3 hours | 4 hours | 5 hours |
|---|---|---|---|---|
| Conversion (%) | 100.00 | 100.00 | 100.00 | 100.00 |
| C1 (wt. %) | 1.29 | 1.68 | 1.74 | 1.44 |
| C2 (wt. %) | 0.78 | 1.17 | 1.34 | 1.71 |
| C2 (wt. %) | 0.13 | 0.14 | 0.14 | 0.27 |
| C3 + C4 (wt. %) | 19.96 | 20.61 | 22.41 | 23.87 |
| Gas Paraffins & Olefins | 22.16 | 23.59 | 25.63 | 27.28 |
| C5 (wt. %) | 0.00 | 0.00 | 0.00 | 0.00 |
| C6 (wt. %) | 0.00 | 0.00 | 0.00 | 0.00 |
| C7 (wt. %) | 0.00 | 0.00 | 0.00 | 0.00 |
| C8 (wt. %) | 0.00 | 0.00 | 0.00 | 0.00 |
| C9 + (wt. %) | 0.00 | 0.00 | 0.00 | 0.00 |
| Liquid Paraffins & Olefins | 0.00 | 0.00 | 0.00 | 0.00 |
| Benzene (wt. %) | 35.78 | 34.82 | 34.51 | 33.43 |
| Toluene (wt. %) | 36.08 | 36.13 | 33.66 | 32.95 |
| Ethyl Benzene (wt. %) | 0.10 | 0.04 | 0.03 | 0.05 |
| 1,2-Xylene (wt. %) | 1.15 | 0.96 | 1.13 | 1.13 |
| 1,3-Xylene (wt. %) | 2.81 | 2.41 | 2.46 | 2.38 |
| 1,4-Xylene (wt. %) | 1.38 | 1.21 | 1.16 | 1.12 |
| Total BTEX (wt. %) | 77.30 | 75.58 | 72.95 | 71.06 |
| 1,3,5-trimethyl benzene (wt. %) | 0.07 | 0.07 | 0.12 | 0.11 |
| 1,2,4-trimethyl benzene (wt. %) | 0.18 | 0.21 | 0.32 | 0.38 |
| 1,4-methyl-i-propylbenzene (wt. %) | 0.30 | 0.54 | 0.98 | 1.16 |
| Total C9+ Aromatics (wt. %) | 0.55 | 0.83 | 1.42 | 1.66 |
| Total Aromatics | 77.84 | 76.41 | 74.37 | 72.72 |
| Total | 100.00 | 100.00 | 100.00 | 100.00 |
| RON | 114.9 | 115 | 114.8 | 114.9 |
| MON | 101.1 | 101.2 | 101.2 | 101.4 |

The prevalence of BTX (benzene, toluene, xylenes) in the generated product stream is apparent from a review of Table 6. In particular it is noted that on average the plastic pyrolysis oil generated 34.6 wt %, 34.7 wt % and 4.8 wt % benzene, toluene and xylenes, respectively for an average total generation of BTX of 77.2 wt % of the generated product. Further, it is noted that the research octane number (RON) of the total liquid products was an average of 114.9 and the motor octane number (MON) of the total liquid products was an average of 101.2, indicating that the product is a high octane gasoline.

It will be appreciated that in instances where pyrolysis oil is directly fed to an aromatization unit without the di-olefin removal procedures, the di-olefins would deactivate the catalyst after a short period of time as the di-olefins are reactive and would polymerize. As such, it is impractical to prepare a comparative example where a stream of untreated pyrolysis oil is processed.

It should now be understood the various aspects of the method of producing pyrolysis products from a mixed plastics stream and associated system for processing mixed plastics into plastic pyrolysis products are described and such aspects may be utilized in conjunction with various other aspects.

According to a first aspect, a method of producing pyrolysis products from a mixed plastics stream includes (a) conducting pyrolysis of a plastic feedstock to produce a stream of plastic pyrolysis oil; (b) feeding the plastic pyrolysis oil to an aromatization unit comprising an aromatization reactor with an aromatization catalyst disposed therein to generate an aromatics rich stream; and (c) passing the aromatics rich stream to an aromatics recovery complex to separate the aromatics rich stream into a BTX fraction, a gasoline blending fraction, a gas fraction comprising hydrogen and C1-C4 hydrocarbons, and an aromatic bottoms fraction comprising hydrocarbons boiling above 180° C. The BTX fraction consists of benzene, toluene and mixed xylenes and the gasoline blending fraction comprises aliphatic hydrocarbons with a boiling range from C5 hydrocarbons up to the aromatic bottoms fraction.

A second aspect includes the method of the first aspect in which the method further comprises feeding the plastic pyrolysis oil to a first fractionator to separate the plastic pyrolysis oil into a first distillate fraction comprising hydrocarbons boiling in the range of 36 to 370° C. and a residual heavy fraction comprising hydrocarbons boiling above 370° C., and feeding the first distillate fraction to the aromatization unit in lieu of an entirety of the plastic pyrolysis oil.

A third aspect includes the method of the second aspect in which the aromatization unit further comprises a selective hydrogenation unit configured and operated to remove di-olefins by hydrogenation from the first distillate fraction to produce a first product stream of dedioletinized plastic pyrolysis first distillate, where the dediolietinized plastic pyrolysis first distillate is provided to the aromatization reactor to generate the aromatics rich stream.

A fourth aspect includes the method of the second in which the first fractionator further separates the first distillate fraction into a plastic pyrolysis naphtha stream and a plastic pyrolysis second distillate stream; and the aromatization unit is split into a naphtha aromatization unit comprising a naphtha aromatization reactor fed by the plastic pyrolysis naphtha stream and a second distillate aromatization unit comprising a second distillate aromatization reactor fed by the plastic pyrolysis second distillate stream.

A fifth aspect includes the method of the fourth aspect in which the plastic pyrolysis naphtha stream comprises hydrocarbons boiling in the range of 36 to 110° C. and the plastic pyrolysis second distillate stream comprises hydrocarbons boiling in the range of 110 to 370° C.

A sixth aspect includes the method of the fourth or fifth aspect in which the naphtha aromatization unit further comprises a naphtha selective hydrogenation unit configured and operated to remove di-olefins by hydrogenation from the plastic pyrolysis naphtha stream to produce a second product stream of dediolefinized plastic pyrolysis naphtha and the second distillate aromatization unit further comprises a second distillate selective hydrogenation unit configured and operated to remove di-olefins by hydrogenation from the plastic pyrolysis second distillate stream to produce a third product stream of dediolefinized plastic pyrolysis second distillate. The dediolefinized plastic pyrolysis naphtha is provided to the naphtha aromatization reactor to generate a first aromatics rich stream and the dediolefinized plastic pyrolysis second distillate is provided to the second distillate aromatization reactor to generate a second aromatics rich stream. The first aromatics rich stream and the second aromatic rich stream are provided to the aromatic recovery complex in lieu of the aromatics rich stream.

A seventh aspect includes the method of any of the first through sixth aspects in which the plastic feedstock comprises mixed plastics of differing compositions.

An eighth aspect includes the method of any of the first through seventh aspects in which the method further comprises feeding the residual heavy fraction comprising hydrocarbons boiling above 370° C. to a demetallization operation to remove metallic constituents from the residual heavy fraction and generate a demetallized residual heavy fraction stream.

A ninth aspect includes the method of the third aspect in which the selective hydrogenation unit includes a hydrogenation catalyst, the hydrogenation catalyst comprising a nickel catalyst on one or more of an alumina support, a silica support, and a titania support.

A tenth aspect includes the method of the sixth aspect in which the naphtha selective hydrogenation unit and the second distillate selective hydrogenation unit each include a hydrogenation catalyst, the hydrogenation catalyst comprising a nickel catalyst on one or more of an alumina support, a silica support, and a titania support.

An eleventh aspect includes the method of the third aspect in which the selective hydrogenation unit is operated at a temperature of 150 to 210° C.

A twelfth aspect includes the method of the sixth aspect in which the naphtha selective hydrogenation unit and the second distillate selective hydrogenation unit are operated at a temperature of 150 to 210° C.

A thirteenth aspect includes the method of any of the first through third aspects in which the aromatization reactor is operated at a temperature of 450 to 600° C.

A fourteenth aspect includes the method of any of the fourth through sixth aspects in which the naphtha aromatization reactor and the second distillate aromatization reactor are operated at a temperature of 450 to 600° C.

A fifteenth aspect includes the method of any of the first through fourteenth aspects in which the aromatization reactor includes an aromatization catalyst comprising a shape selective zeolite selected from medium pore zeolite, large pore zeolite, small pore zeolite, mesoporous zeolite, and combinations thereof.

A sixteenth aspect includes the method of the fifteenth aspect in which the shape selective zeolite is doped with one or more of Zn, Zr, and Ga.

A seventeenth aspect includes the method of the fifteenth or sixteenth aspect in which the aromatization catalyst comprises 5 wt. % to 80 wt. % zeolite.

An eighteenth aspect includes the method of any of the first through seventeenth aspects in which the pyrolysis of a plastic feedstock is performed in the presence of a catalyst at a temperature of 300 to 1000° C.

According to a nineteenth aspect a system for processing mixed plastics into plastic pyrolysis products includes an inlet stream comprising mixed plastics; a plastic pyrolysis unit, the plastic pyrolysis unit in fluid communication with the inlet stream, and operable to generate a stream of plastic pyrolysis oil from the inlet stream; an aromatization unit in fluid communication with the stream of plastic pyrolysis oil, the aromatization unit comprising an aromatization reactor with an aromatization catalyst disposed therein operable to generate an aromatics rich stream; and an aromatics recovery complex in fluid communication with the aromatics rich stream, the aromatics recovery complex operable to separate the aromatics rich stream into a BTX fraction, a gasoline blending fraction, a gas fraction comprising hydrogen and C1-C4 hydrocarbons, and an aromatic bottoms fraction comprising hydrocarbons boiling above 180° C. The BTX fraction consists of benzene, toluene and mixed xylenes and the gasoline blending fraction comprises aliphatic hydrocarbons with a boiling range from C5 hydrocarbon up to the aromatic bottoms fraction.

A twentieth aspect includes the system of the nineteenth aspect in which the system further comprises a first fractionator, the first fractionator in fluid communication with the stream of plastic pyrolysis oil to separate the plastic pyrolysis oil into a first distillate fraction comprising hydrocarbons boiling in the range of 36 to 370° C. and a residual heavy fraction comprising hydrocarbons boiling above 370° C. with the first distillate fraction in fluid communication with the aromatization unit in lieu of an entirety of the stream of plastic pyrolysis oil.

A twenty-first aspect includes the system of the twentieth aspect in which the aromatization unit further comprises a selective hydrogenation unit in fluid communication with the first distillate fraction, the selective hydrogenation unit configured and operated to remove di-olefins by hydrogenation from the first distillate fraction to produce a first product stream of dediolefinized plastic pyrolysis first distillate, where the dediolefinized plastic pyrolysis first distillate is provided in direct communication with the aromatization reactor to generate the aromatics rich stream.

A twenty-second aspect includes the system of the twentieth aspect in which the first fractionator further separates the first distillate fraction into a plastic pyrolysis naphtha stream and a plastic pyrolysis second distillate stream; and the aromatization unit is split into a naphtha aromatization unit comprising a naphtha aromatization reactor and a second distillate aromatization unit comprising a second distillate aromatization reactor.

A twenty-third aspect includes the system of the twenty-second aspect in which the plastic pyrolysis naphtha stream comprises hydrocarbons boiling in the range of 36 to 110° C. and the plastic pyrolysis second distillate stream comprises hydrocarbons boiling in the range of 110 to 370° C.

A twenty-fourth aspect includes the system of the twenty-second or twenty-third aspect in which the naphtha aromatization unit further comprises a naphtha selective hydrogenation unit in fluid communication with the plastic pyrolysis naphtha stream, the naphtha selective hydrogenation unit configured and operated to remove di-olefins by hydrogenation from the plastic pyrolysis naphtha stream to produce a second product stream of dediolefinized plastic pyrolysis naphtha, where the dediolefinized plastic pyrolysis naphtha is provided in direct communication with the naphtha aromatization reactor to generate a first aromatic rich stream; and the second distillate aromatization unit further comprises a second distillate selective hydrogenation unit in fluid communication with the plastic pyrolysis second distillate stream, the second distillate selective hydrogenation unit configured and operated to remove di-olefins by hydrogenation from the plastic pyrolysis second distillate stream to produce a third product stream of dediolefinized plastic pyrolysis second distillate, where the dediolefinized plastic pyrolysis second distillate is provided in direct communication with the second distillate aromatization reactor to generate a second aromatics rich stream. Further, the first aromatics rich stream and the second aromatics rich stream are provided in fluid communication with the aromatics recovery complex in lieu of the aromatics rich stream.

A twenty-fifth aspect includes the system of any of the nineteenth through twenty-fourth aspects in which the system further comprises a pretreater to remove contaminants from one or more of the plastic pyrolysis oil, the first distillate fraction, the plastic pyrolysis naphtha stream, and the plastic pyrolysis second distillate stream to introduction to the aromatization unit 154

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A method of producing pyrolysis products from a mixed plastics stream, the method comprising:
   (a) conducting pyrolysis of a plastic feedstock to produce a stream of plastic pyrolysis oil;
   (b) feeding the plastic pyrolysis oil to a first fractionator to separate the plastic pyrolysis oil into a first distillate fraction comprising hydrocarbons boiling in the range of 36 to 370° C. and a residual heavy fraction comprising hydrocarbons boiling above 370° C.;
   (c) feeding the first distillate fraction to an aromatization unit comprising an aromatization reactor with an aromatization catalyst disposed therein to generate an aromatics rich stream; and
   (d) passing the aromatics rich stream to an aromatics recovery complex to separate the aromatics rich stream into a BTX fraction, a gasoline blending fraction, a gas fraction comprising hydrogen and C1-C4 hydrocarbons, and an aromatic bottoms fraction comprising hydrocarbons boiling above 180° C., where the BTX fraction consists of benzene, toluene and mixed xylenes and the gasoline blending fraction comprises aliphatic hydrocarbons with a boiling range from C5 hydrocarbon up to the aromatic bottoms fraction.

2. The method of claim 1, where the aromatization unit further comprises a selective hydrogenation unit configured and operated to remove di-olefins by hydrogenation from the first distillate fraction to produce a first product stream of dediolefinized plastic pyrolysis first distillate, where the dediolefinized plastic pyrolysis first distillate is provided to the aromatization reactor to generate the aromatics rich stream.

3. The method of claim 2, where the selective hydrogenation unit includes a hydrogenation catalyst, the hydrogenation catalyst comprising a nickel catalyst on one or more of an alumina support, a silica support, and a titania support.

4. The method of claim 2, where the selective hydrogenation unit is operated at a temperature of 150 to 210° C.

5. The method of claim 1, where the first fractionator further separates the first distillate fraction into a plastic pyrolysis naphtha stream and a plastic pyrolysis second distillate stream; and the aromatization unit is split into a naphtha aromatization unit comprising a naphtha aromatization reactor fed by the plastic pyrolysis naphtha stream and a second distillate aromatization unit comprising a second distillate aromatization reactor fed by the plastic pyrolysis second distillate stream.

6. The method of claim 5, where the plastic pyrolysis naphtha stream comprises hydrocarbons boiling in the range of 36 to 110° C. and the plastic pyrolysis second distillate stream comprises hydrocarbons boiling in the range of 110 to 370° C.

7. The method of claim 5, where the naphtha aromatization unit further comprises a naphtha selective hydrogenation unit configured and operated to remove di-olefins by hydrogenation from the plastic pyrolysis naphtha stream to produce a second product stream of dediolefinized plastic pyrolysis naphtha and the second distillate aromatization unit further comprises a second distillate selective hydrogenation unit configured and operated to remove di-olefins by hydrogenation from the plastic pyrolysis second distillate stream to produce a third product stream of dediolefinized plastic pyrolysis second distillate, where the dediolefinized plastic pyrolysis naphtha is provided to the naphtha aromatization reactor to generate a first aromatics rich stream and the dediolefinized plastic pyrolysis second distillate is provided to the second distillate aromatization reactor to generate a second aromatics rich stream, where the first aromatics rich stream and the second aromatics rich stream are provided to the aromatics recovery complex in lieu of the aromatics rich stream.

8. The method of claim 7, where the naphtha selective hydrogenation unit and the second distillate selective hydrogenation unit each include a hydrogenation catalyst, the hydrogenation catalyst comprising a nickel catalyst on one or more of an alumina support, a silica support, and a titania support.

9. The method of claim 7, where the naphtha selective hydrogenation unit and the second distillate selective hydrogenation unit are operated at a temperature of 150 to 210° C.

10. The method of claim 1, where the plastic feedstock comprises mixed plastics of differing compositions.

11. The method of claim 1, where the method further comprises feeding the residual heavy fraction comprising hydrocarbons boiling above 370° C. to a demetallization operation to remove metallic constituents from the residual heavy fraction and generate a demetallized residual heavy fraction stream.

12. The method of claim 1, where the aromatization reactor includes an aromatization catalyst comprising a shape selective zeolite selected from medium pore zeolite, large pore zeolite, small pore zeolite, mesoporous zeolite, and combinations thereof.

13. The method of claim 12, where the shape selective zeolite is doped with a metal modifier selected from one or more of Zn, Zr, and Ga.

14. The method of claim 12, where the aromatization catalyst comprises 5 wt. % to 80 wt. % zeolite.

15. The method of claim 1, where the aromatization reactor is operated at a temperature of 450 to 600° C.

16. The method of claim 1, where the pyrolysis of a plastic feedstock is performed in the presence of a catalyst at a temperature of 300° C. to 1000° C.

\* \* \* \* \*